Nov. 22, 1960  C. SCHOU  2,960,887
CLUTCH SAFETY DEVICE
Filed Feb. 6, 1958

INVENTOR.
CHRIS SCHOU
BY
Lieber, Lieber & Nilles
ATTORNEYS

United States Patent Office 2,960,887
Patented Nov. 22, 1960

2,960,887
CLUTCH SAFETY DEVICE

Chris Schou, Milwaukee, Wis., assignor to Westinghouse Air Brake Company, Wilmerding, Pa., a corporation of Pennsylvania Filed Feb. 6, 1958, Ser. No. 713,661

2 Claims. (Cl. 74—548)

This invention relates to safety mechanisms for a clutch which prevents engagement or disengagement of the clutch while its associated engine is operating. More particularly, it relates to a manually operable by-pass valve for a hydraulic pump which furnishes pressure fluid to a clutch actuator.

Devices of this general character have been proposed and used with success. For example, a sleeve which is shiftable by pressure in the engine oil line is used to cover the otherwise exposed manually operated by-pass valve actuating knob.

The present invention provides a safety mechanism for a clutch to prevent engagement or disengagement thereof while the engine to which it is connected is running, which mechanism has a manually operated knob that is always fully exposed but positively disconnected from its by-pass valve whenever the engine is operating.

The invention provides a simple safety device of the above type which is foolproof in operation and economical to manufacture.

Figure 1:
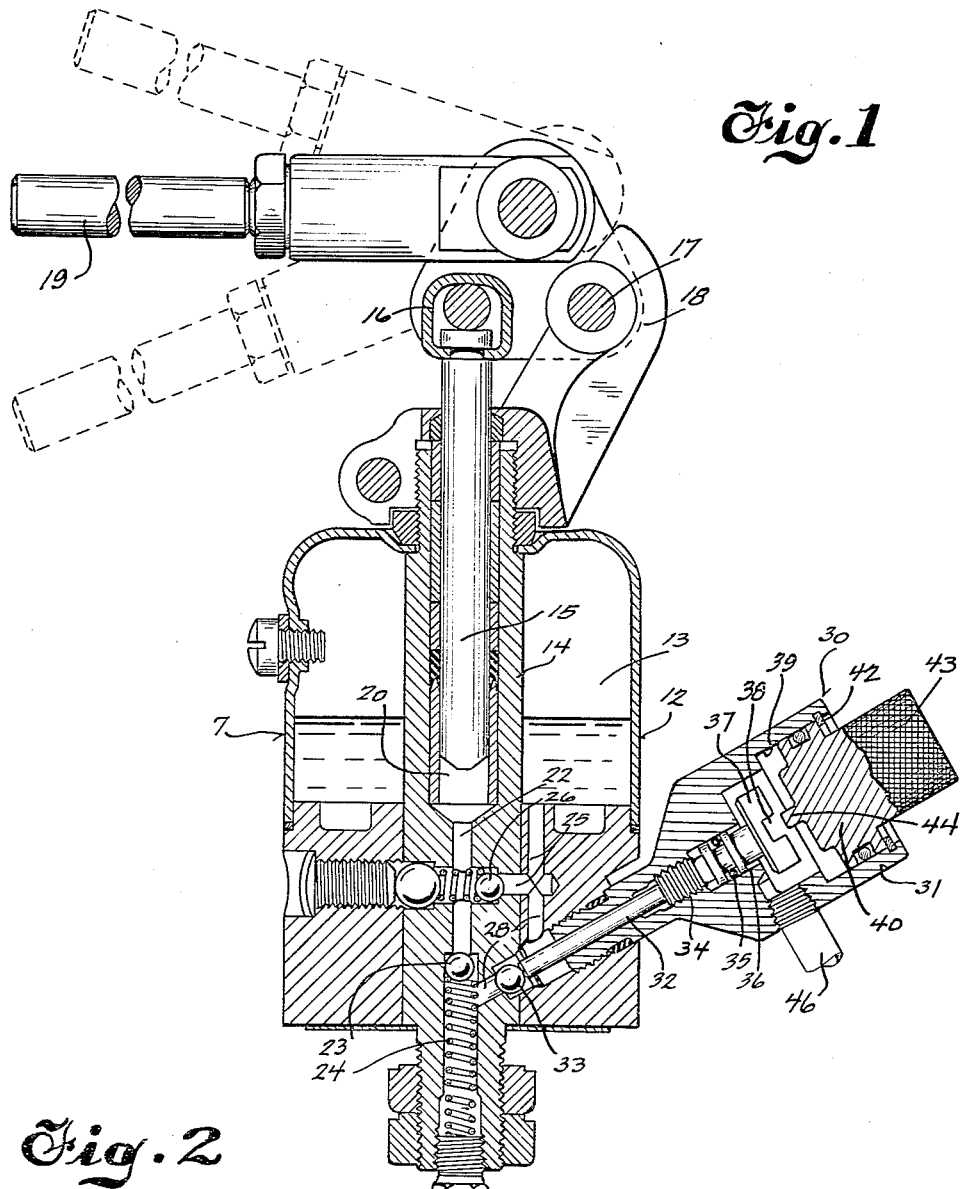
Figure 2:
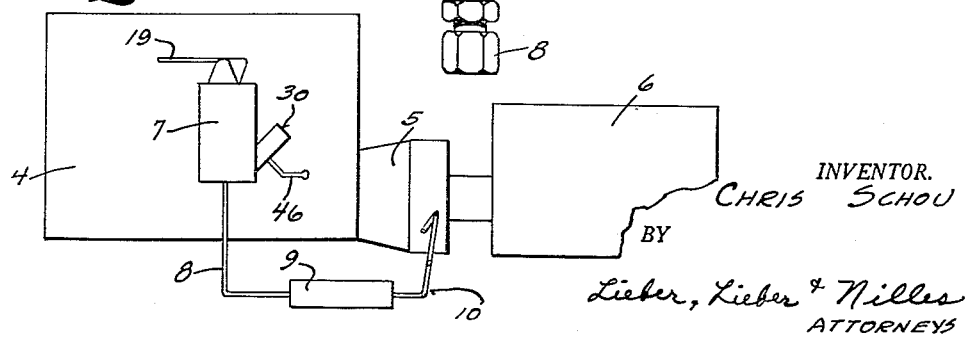

These and other objects and advantages of the invention will appear hereinafter as this disclosure progresses, reference being had to the accompanying drawings, in which:

Figure 1 is an elevational cross sectional view of a clutch mechanism safety device made in accordance with the present invention; and Figure 2 is a schematic diagram of an engine-clutch-compressor set incorporating the safety mechanism of the invention.

Referring in greater detail to the drawings, a power source in the form of an internal combustion engine 4 is connected by means of a clutch 5 to a driven machine which may be considered to be a compressor 6.

A fluid pump 7 is connected via conduit 8 to a hydraulically operated clutch actuator 9. The actuator is connected to the clutch by the conventional linkage 10 to engage and disengage the clutch in the well-known manner. It is believed sufficient to say that by pressurizing the line 8, the clutch is disengaged and by releasing the pressure from line 8 the clutch is moved to its engaged position by its conventional internal springs (not shown).

The pump 7 comprises a housing 12 having a fluid reservoir 13 in its upper portion and a vertically disposed center cylindrical member 14 extending therethrough. A pumping plunger 15 is reciprocable in the member 14. A linkage member 16 is pivotally connected at 17 to a support 18 and is also pivotally connected with the upper end of the piston 15. Vertical swinging of handle 19 causes corresponding vertical movement of the plunger in its chamber 20 to effect a suction stroke when moved in the upward direction and a pumping stroke when moved downwardly.

The pumping chamber 20 is in fluid delivering communication with conduit 8 via passage 22. A ball check valve 23 is urged by its spring 24 to a seated position to permit fluid to pass only in one direction. An L-shaped passage 25 places the reservoir 13 in communication with passage 22 via the spring loaded one-way ball check valve 26. The valve 26 closes off communication between the reservoir and passage 22 when the pump is not operating, but permits fluid to be drawn into the pumping chamber 20 when the plunger 15 is moving in its suction stroke.

An L-shaped fluid by-pass passage 28 places the reservoir in communication with the lower end of passage 22.

The clutch safety device 30 includes a housing 31 threaded into the lower portion of housing 12 and has a compound stem 32 including a pin portion extending into by-pass passage 28 and in contact with ball check valve 33. The stem includes a threaded adapter portion engaged in the housing as at 34 and has a seal 35 in counterbore 36 to prevent leakage therebetween. The upper portion of the stem has an enlarged head 37 formed integrally therewith and an interengaging means in the form of a slot 38 in the upper surface of the head.

The upper end of the housing 31 has a large bore 39 in which the piston 40 is sealingly and slidably engaged. The piston is held captive in the bore by snap ring 42 and extends outwardly from the bore where it terminates in a knurled knob portion 43. The inner end of the piston has an interengaging means in the form of a tang 44 which is complementary to slot 38 and is engageable therein.

A conduit 46 is threaded into housing 31 and places the interior of the housing in fluid communication with the conventional oil pressure system of the engine which contains a pump (not shown) for furnishing oil lubrication to the engine. By means of conduit 46, whenever the engine is running, pressure fluid is furnished to housing 31 and acts to urge the piston outwardly and out of engagement with stem 32. Therefore, whenever the engine is operating, the check ball valve 33 cannot be moved by the stem and consequently the clutch 5 cannot be engaged or disengaged, as will appear.

Under operating conditions, it is often desirable to run the engine to warm it up without operating the compressor 6 or other attached machine. Thus, before starting the engine, the knob 43 would be pushed in to engage the stem and seat the valve 33. The operator then pumps handle 19 to pressurize the actuator 9 and thereby disengage the clutch. When the engine is then started, pressure fluid is delivered by the engine lubrication pump (not shown) via conduit 46 to cause the piston 40 to move outwardly. The pressure acting on the piston is sufficient to prevent it from being pushed in to engage the stem. Only when the engine and its lubrication pump have stopped will the operator be able to unseat valve 33 to release pressure fluid from the clutch 5 and thereby engage it.

Various modes of carrying out the invention are contemplated as being within the scope of the following claims particularly pointing out and distinctly claiming the subject matter which is regarded as the invention.

I claim:

1. A valve assembly comprising, a housing having therein aligned bores of different diameters, the smaller of which is threaded and the larger of which forms an outwardly open chamber within the housing adjoining the inner end of the smaller bore, a valve stem extending through and threadably coacting with the smaller bore with one end of the said stem terminating within said chamber, a piston confined within said chamber and freely rotatable and axially slidable therein for movement toward and away from the adjacent end of said stem, said piston and said stem having interengageable means at their adjacent ends for transmitting rotary motion of the piston to the stem upon engagement thereof, a constantly accessible gripping and manipulating knob on said piston integral therewith and extending outwardly from the open end of said chamber exteriorly of said housing, and means for supplying fluid under pressure to said chamber to move said piston away from said stem and thereby disengage the same.

2. A valve assembly comprising, a housing having therein aligned bores of different diameters, the smaller of which is threaded and the larger of which forms an outwardly open chamber within the housing adjoining the inner end of the smaller bore, a valve stem extending through and threadably coacting with the smaller bore with one end of the said stem terminating within said chamber and provided with a transversely slotted head, a piston confined within said chamber and freely rotatable and axially slidable therein for movement toward and away from the adjacent slotted head of said stem, said piston having a transverse tang engageable with the slot of said stem head for transmitting rotary motion of the piston to the stem upon inward movement and rotation of said piston, a constantly accessible gripping and manipulating knob on said piston integral therewith and extending outwardly from the open end of said chamber exteriorly of said housing, and means for supplying fluid under pressure to said chamber to move said piston away from said stem head to thereby disengage said tang from said slot.

References Cited in the file of this patent

UNITED STATES PATENTS

| | | |
|---|---|---|
| 536,053 | Waldron | Mar. 19, 1895 |
| 537,773 | Hoy et al. | Apr. 16, 1895 |
| 2,395,459 | Carnagua | Feb. 26, 1946 |
| 2,618,366 | Bryant | Nov. 18, 1952 |
| 2,665,674 | Metsger et al. | Jan. 12, 1954 |
| 2,780,333 | Reiser et al. | Feb. 5, 1957 |
| 2,797,592 | Marrapese | July 2, 1957 |
| 2,804,186 | Keir et al. | Aug. 27, 1957 |